United States Patent Office 2,850,517
Patented Sept. 2, 1958

2,850,517
RECOVERY OF UNCONTAMINATED GUANIDINE THIOCYANATE

George N. Gagliardi, Springdale, Conn.

No Drawing. Application July 1, 1957
Serial No. 668,847

5 Claims. (Cl. 260—454)

The present invention relates to the recovery of guanidine thiocyanate from a reaction mixture containing the same. More particularly, it relates to the quantitative recovery of substantially pure guanidine thiocyanate from a mixture comprising an aqueous solution of guanidine thiocyanate, ammonium thiocyanate, thiourea and melamine.

As is known, guanidine thiocyanate can be prepared from the fusion of ammonium thiocyanate. When guanidine thiocyanate is so prepared, it is unavoidably contaminated. The contaminants are in the main unreacted ammonium thiocyanate, thiourea and melamine. To the present, neither chemical nor physical separation procedures have been reported as singularly successful in effecting recovery of substantially uncontaminated guanidine thiocyanate in quantitative yields.

As is also known, guanidine thiocyanate is a valuable intermediate in guanidine nitrate manufacture. Although recovery of guanidine nitrate in substantially pure form is relatively difficult, it is less so than purifying guanidine thiocyanate from the reaction mixture. Accordingly, in the past it has been customary to treat the crude guanidine thiocyanate reaction mixture directly with aqueous ammonium nitrate. A highly contaminated solution comprising guanidine nitrate is formed. Effort is then directed to purification and recovery therefrom of uncontaminated guanidine nitrate.

Although this indirect method has to the present been used as the best compromise, it is not as satisfactory as is desired. Therefore, if the contaminants in guanidine thiocyanate as prepared by ammonium thiocyanate fusion could be easily separated in an economical fashion, such a process would be highly desirable. It is, therefore, a principal object of the present invention to provide a useful method for separating contaminants from mixtures containing guanidine thiocyanate, ammonium thiocyanate, thiourea and melamine prior to the formation of guanidine nitrate therefrom.

It is a further object of the invention to provide a method for the removal of melamine from a guanidine thiocyanate reaction product.

It is also an object to remove a mixture of ammonium thiocyanate and thiourea from a guanidine thiocyanate reaction product resulting from the fusion of ammonium thiocyanate.

Surprisingly, the above, and other objects apparent to those skilled in the art, have been achieved in a new and novel series of simple, straight-forward treating steps. These in brief involve an initial, substantial removal of melamine, followed by a water removal step.

It is an advantage of the invention that it is carried directly on the above-noted crude mixture comprising guanidine thiocyanate. Such a mixture ordinarily is obtained in a known manner by the fusion of ammonium thiocyanate at temperatures in the range of about 200° C. to 225° C., and followed by the solubilization of the products of fusion by the addition of sufficient water thereto.

According to the present invention, it has been discovered that a crystallized guanidine thiocyanate salt can be obtained as a substantially uncontaminated product by employing the following procedural steps which involve:

(1) Adjusting the pH of an aqueous crude guanidine thiocyanate reaction mixture so as to precipitate melamine as a salt;

(2) Removing the melamine salt by filtration or its equivalent; and (3) Effecting the precipitation of guanidine thiocyanate from the resultant solution by concentrating the mixture with water removal, whereby contaminants remain solubilized and a major portion of the guanidine thiocyanate precipitates. Resultant guanidine thiocyanate can be separated from soluble contaminants. It is recovered as by filtering, centrifuging or the like in any manner known in the art.

While each of the above-noted procedural steps in itself is relatively simple, they are all critical features of the overall invention. Other than by their novel combination, an uncontaminated guanidine thiocyanate is not obtained. Each will therefore be more specifically discussed.

In general, after the crude fusion reaction mixture has been brought into aqueous solution, the latter will contain about 35%–55% solids and usually have a pH above about 5. In the first step of the invention, the pH is adjusted to between about 3.5 and 4.5, preferably to a pH of about 4. Under these conditions, it has been found that a major portion of the melamine is precipitated as melamine thiocyanate. As such, it is removed from the crude reaction mixture as by filtration, for example.

Resultant solution is next treated with a basic substance, such as ammonia gas, to increase the pH to between about 5.5 and 6.5. This is necessary to convert any residual unprecipitated melamine thiocyanate to free melamine. The latter is present in amounts insufficient to prevent the precipitation of guanidine thiocyanate in subsequent treating steps. The solution is then subjected to treatment whereby at least 50%, but not more than about 75%, of its water content is removed. Conveniently, water removal can be effected by the use of known vacuum crystallization techniques. When the water content in the mixture is so-adjusted, guanidine thiocyanate will separate from the mixture as a precipitate in a substantially pure and uncontaminated form. Resultant precipitate may be subjected to centrifugal action to recover the guanidine thiocyanate in good yields.

It is an advantage of the present invention that so-formed guanidine thiocyanate can be doubly decomposed with aqueous ammonium nitrate in the usual manner. Absent the normally found contaminants, uncontaminated guanidine nitrate is recoverable expeditiously and economically from the mixture containing guanidine nitrate and ammonium thiocyanate by conventional froth flotation and fractional crystallization techniques. This is due to the absence of ammonium thiocyanate-thiourea double salt formation which contaminates the guanidine nitrate product.

A preferred embodiment of the invention will be exemplified in the following example which is to be taken as illustrative and is not to be construed as being limitative thereof. The parts given are by weight unless otherwise specified.

*Example*

A crude aqueous solution containing 290 parts guanidine thiocyanate, 28.3 parts ammonium thiocyanate, 13.8 parts thiourea, 16.2 parts melamine and 329 parts water is introduced into a suitable vessel. The hydrogen ion concentration of the solution is adjusted to a pH of 4 by introducing aliquot portions of nitric acid. Melamine thiocyanate precipitates out of solution to the extent of 23.8 parts. It is separated by filtration and the filtrate is next readjusted to a pH between 5.5 and 6.5 by the addition thereto of ammonia gas. The composition of the filtrate comprises 290 parts guanidine thiocyanate, 18.5 parts ammonium thiocyanate, 13.8 parts thiourea, 6.6 parts melamine and 329 parts water. The latter filtrate is subjected to treatment with an alkaline material for purposes of solubilizing any residual melamine salt which had not been previously removed. Guanidine thiocyanate is next removed from resultant filtrate by subjecting the latter to vacuum crystallization whereby approximately 174 parts of water is removed or otherwise eliminated. At that point, guanidine thiocyanate precipitates out of solution. By subjecting the resultant mixture to centrifuging, 96.7 parts of substantially uncontaminated guanidine thiocyanate is obtained.

Residual solution comprising a mixture of 193.3 parts guanidine thiocyanate, 18.5 parts ammonium thiocyanate, 13.8 parts thiourea, 6.6 parts melamine and 154.8 parts water is obtained and is recycled to the initial ammonium thiocyanate reaction stage for further processing.

In the example above, it will be noted that the separation procedure involves the initial separation of melamine in the form of its insoluble thiocyanate salt from the solution of the crude reaction product comprising guanidine thiocyanate. This procedure is carried out at room temperature or below, usually in the range of from between about 10° C. to 25° C., and adjusting the pH of the solution by the introduction of a strong inorganic acid, such as nitric or hydrochloric acid, in the usual manner. The pH of the solution is adjusted to that between 3.5 and 4.5 as previously stated. However, if the pH falls below 3.5, ammonium thiocyanate will be converted to gaseous thiocyanic acid, thereby resulting in loss of ammonium thiocyanate. Otherwise, the latter cannot subsequently be reprocessed to form additoinal guanidine thiocyanate. If, on the other hand, a pH in excess of 4.5 is used, the melamine remains soluble and, consequently, cannot be separated as such.

Subsequent to melamine salt removal, resultant filtrate must be readjusted with respect to the hdrogen ion concentration of the solution by increasing the pH to between 5.5 and 6.5. A good practice is to subject the readjusted filtrate to vacuum distillation at temperatures beween 25° C. and 35° C. at between 10 and 30 mm. mercury pressure. In so proceeding, it has been found that when the above-noted considerations are observed, guanidine thiocyanate in substantially uncontaminated form is obtained.

I claim:
1. In an improved process for the recovery of guanidine thiocyanate from a multi-component feed mixture comprising a solution of guanidine thiocyanate, ammonium thiocyanate, thiourea, melamine in water, the steps which comprise: adjusting the pH of the latter solution to between about 3.5 and 4.5, thereby solely insolubilizing melamine as melamine thiocyanate; removing resultant melamine thiocyanate from the latter solution; readjusting the pH of the solution to between about 5.5 and 6.5; removing at least 50% but not more than about 75% of the water content from the thus-readjusted solution; subjecting the latter to centrifugal action to precipitate substantially pure guanidine thiocyanate; and recovering the latter in an uncontaminated form.

2. A process according to claim 1 in which the pH of the multi-component feed mixture is adjusted to between about 3.5 and 4.5 and thereafter separating melamine thiocyanate from the thus-adjusted mixture at a temperature between about 10° C. and 25° C.

3. A process according to claim 1 in which the pH of the multi-component feed mixture is adjusted to pH 4.

4. A process according to claim 1 in which the filtrate subsequent to melamine removal is concentrated to remove at least 50% of its water content by subjecting the latter filtrate to vacuum crystallization at a temperature between about 25° C. and about 35° C.

5. A process according to claim 4 in which the applied vacuum is held at between about 10 and 30 mm. mercury pressure.

No references cited.

UNITED STATES PATENT OFFICE

CERTIFICATE OF CORRECTION

Patent No. 2,850,517                                                  September 2, 1958

George N. Gagliardi

It is hereby certified that error appears in the above numbered patent requiring correction and that the said Letters Patent should read as corrected below.

In the grant, lines 1, 2 and 3, for "George N. Gagliardi, of Springdale, Connecticut," read -- George N. Gagliardi, of Springdale, Connecticut, assignor to American Cyanamid Company, of New York, N. Y., a corporation of Maine, --; line 12, for "George N. Gagliardi, his heirs" read -- American Cyanamid Company, its successors --; in the heading to the printed specification, line 4, for "George N. Gagliardi, Springdale, Conn." read -- George N. Gagliardi, Springdale, Conn., assignor to American Cyanamid Company, New York, N. Y., a corporation of Maine --.

Signed and sealed this 3rd day of February 1959.

(SEAL)
Attest:

KARL H. AXLINE
Attesting Officer

ROBERT C. WATSON
Commissioner of Patents